March 24, 1959 D. W. DOUGLASS 2,879,009
LINE DRYING REEL
Filed July 1, 1955 2 Sheets-Sheet 1

INVENTOR.
DAYTON W. DOUGLASS,
BY
McMorrow, Berman + Davidson
ATTORNEYS.

March 24, 1959 D. W. DOUGLASS 2,879,009
LINE DRYING REEL
Filed July 1, 1955 2 Sheets-Sheet 2

INVENTOR.
DAYTON W. DOUGLASS,
BY
McMorrow, Berman & Davidson
ATTORNEYS

United States Patent Office 2,879,009
Patented Mar. 24, 1959

2,879,009

LINE DRYING REEL

Dayton W. Douglass, Canajoharie, N.Y., assignor of one-half to John R. Farrow, Canajoharie, N.Y.

Application July 1, 1955, Serial No. 519,430

3 Claims. (Cl. 242—104)

This invention relates to a fisherman's equipment, and more particularly to a combined boat anchor line and fishing line support which can be attached to a row boat or other small boat used by fishermen.

A main object of the invention is to provide a novel and improved combination boat anchor line and fishing line support which is simple in construction, which is easy to mount on a row boat or other small boat, and which provides a means of supporting a boat anchor line so that there is no necessity for keeping the anchor line in the boat, the support being further arranged so that the anchor may be held at any desired depth.

A further object of the invention is to provide an improved combination boat anchor line and fishing line support which is relatively inexpensive to manufacture, which is sturdy in construction, which is provided with means for supporting a fishing rod thereon, as well as for supporting a boat anchor line and for supporting a fishing line thereon for drying, the improved boat anchor line and fishing line support being relatively compact in size and light in weight so that it may be easily transported.

Further objects and advantages of the invention will become apparent from the following description and claims, and from the accompanying drawings, wherein:

Figure 1:
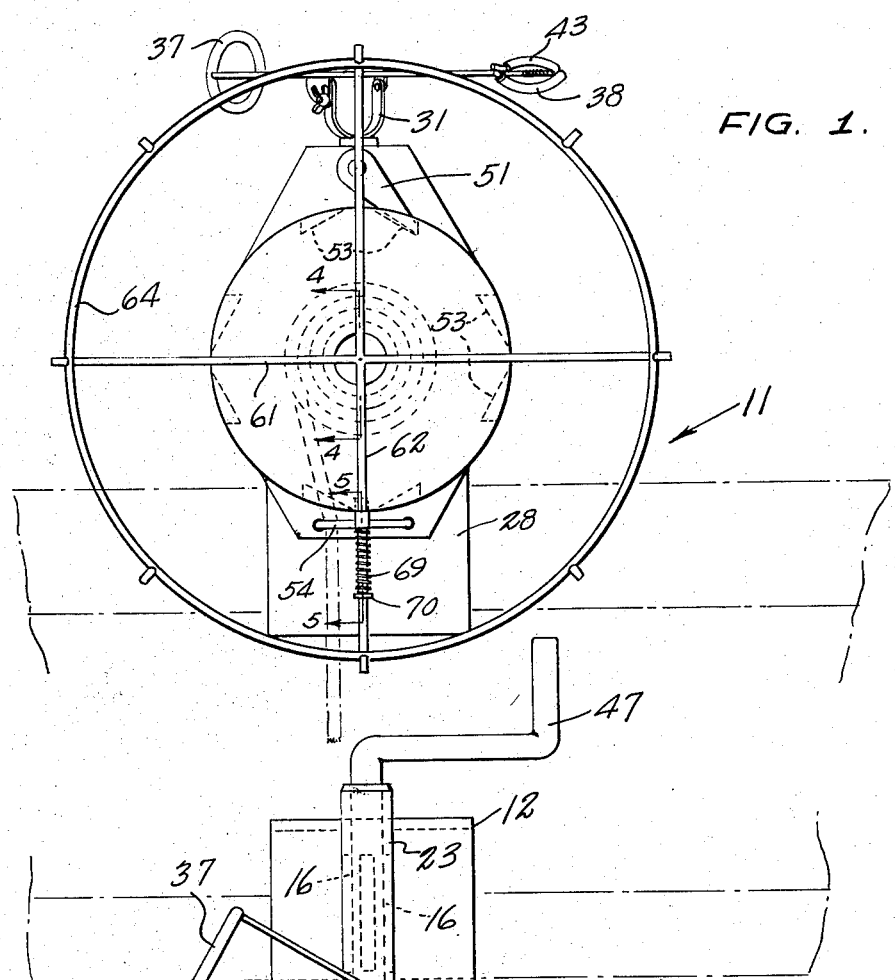
Figure 1 is a side elevational view of an improved combined boat anchor line and fishing line support constructed in accordance with the present invention.

Referring to the drawings, the improved combined boat anchor line and fishing line support is designated generally at 11 and comprises a generally channel shaped bracket member 12 having opposing depending side flanges 13 and 14 and the horizontal top flange 15 formed with the spaced, parallel upstanding vertical lugs 16, 16. Threadedly engaged through the depending flange 14 is a clamping screw 17 which is provided with a clamping foot 18 cooperable with the remaining depending flange 13 to clampingly engage the edge of the side wall 19 of a boat therebetween, whereby the bracket member 12 may be rigidly secured on the top edge of said side wall in the manner illustrated in Figures 1, 2 and 3, wherein the side wall 19 is shown in dotted view.

The top wall 15 of bracket member 12 is formed over the flange 14 with a rib 21 through which is threadedly engaged an adjustable stop screw 22. Designated at 23 is a sleeve member which has rigidly secured thereto the depending lug 24, said lug 24 being received between the upstanding flange 16 and being pivotally connected thereto by a transversely extending horizontal pivot bolt 25 extending through the lugs 16 and through the intervening lug 24. The pivot bolt 25 is provided on one end with a wing nut 26, whereby the sleeve 23 may be locked in an adjusted rotated position, if so desired, by tightening the wing nut 26, the lugs 16 being sufficiently flexible to yield under the pressure of the wing nut 26 and to exert clamping force on the intervening lug 24.

Figure 4:
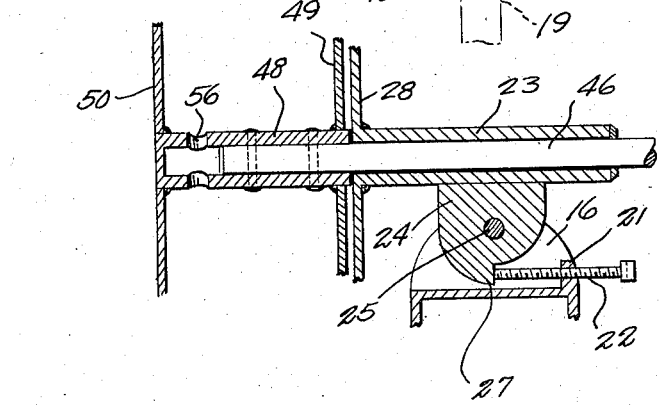
Figure 4 is an enlarged cross sectional detail view taken on line 4—4 of Figure 1.

The lug 24 is formed at its lower portion with a stop abutment 27 engageable by the end of the stop screw 22 to limit counterclockwise rotation of sleeve 23, as viewed in Figure 4.

Sleeve member 23 is formed at its outer end with the flange 28 extending perpendicular to the sleeve. The flange 28 is of substantial height and secured to its top portion is a sleeve-like socket element 29 in which is removably supported the depending stem 30 of a generally Y-shaped yoke member 31.

Figure 2:
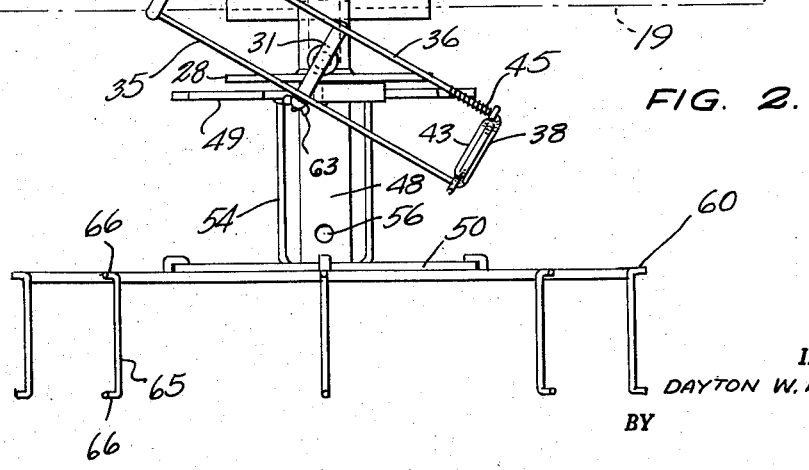
Figure 2 is a top view of the combined boat anchor line and fishing line support of Figure 1.
Figure 3:
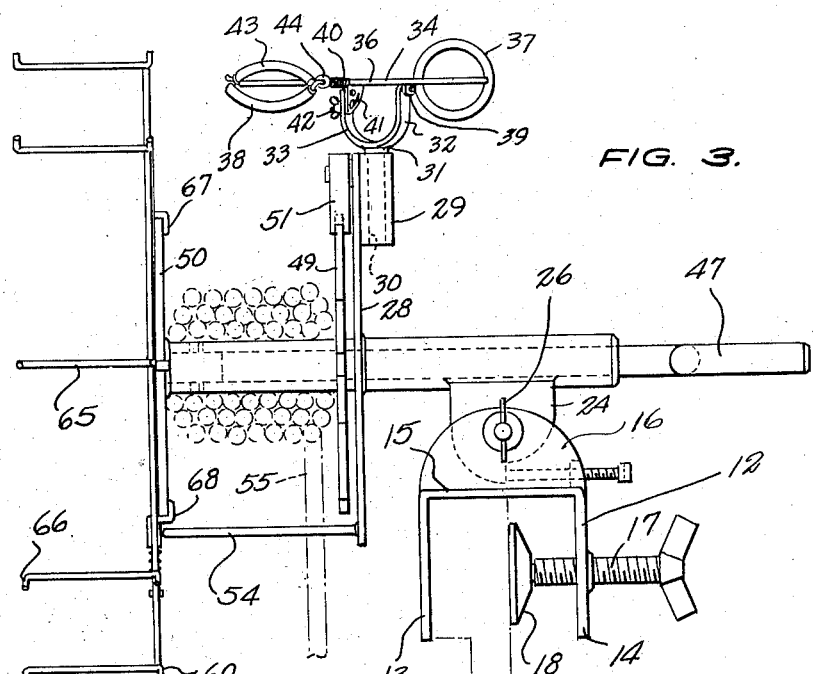
Figure 3 is an end elevational view of the combined boat anchor line and fishing line support of Figures 1 and 2.

As shown in Figures 1 and 3, the yoke member 31 is in the general form of a conventional oar lock and has the upstanding arms 32 and 33. Designated generally at 34 is a fishing rod supporting bracket comprising a pair of parallel side rods 35 and 36 connected at one end by a circular ring element 37 and at the other end by a downwardly bowed saddle element 38. The intermediate portion of the rod 36 is pivotally connected at 39 to the top end of the arm 32, and the intermediate portion on the rod 35 is formed with a depending pivot bracket 40 which is pivotally connected to the top end of the arm 33 and which is provided with an arcuate slot 41 through which extends a clamping bolt 42 provided on its outer end with a wing nut 63, said bolt extending through the arm 33 and being arranged to clampingly secure the depending bracket 40 with the main bracket member 34 arranged at a desired angle.

Designated at 43 is an upwardly bowed clamping arm arranged opposite the saddle member 38 and rotatably mounted on the arm 36 by the provision of a loop or eye 44 on the end of the member 43 which surrounds the rod 36. A coil spring 45 surrounds the rod 36 adjacent the member 43, one end of the spring 45 being secured to the eye 44 and the other end of the spring being secured to the rod 36, the spring being arranged to exert a biasing force on the member 43 urging said member toward the opposing member 38, whereby a fishing rod may be clamped between the opposing arcuate members 43 and 38, with a portion of the rod engaged through a circular loop member 37.

The respective members 38, 43 and 37 are provided with suitable sheaths of resiliently deformable material, such as rubber or the like, so that they may engage the surface of the fishing rod without causing any damage thereto.

Journaled in the sleeve member 23 is a shaft 46 formed at the inner end thereof with a suitable crank handle 47. Secured on the outer end portion of the shaft 46 is a sleeve member 48 which rotates with said shaft, said sleeve member having secured thereon a ratchet wheel 49 arranged adjacent to the flange 28, as shown in Figure 4, and has secured on its outer end a disc 50, whereby a reel is defined between the elements 49 and 50.

Pivoted to the top portion of flange 28 is a pawl 51 which engages the periphery of the ratchet wheel 49. As shown in Figure 1, the ratchet wheel 49 may be formed with successive pairs of oppositely inclined notches 53 in which the pawl 51 is engageable, depending upon the position of the pawl 51. As shown in Figure 1, the pawl 51 may be arranged to extend downwardly to the right, whereby said pawl will allow the ratchet wheel 49 and the shaft 46 to be rotated clockwise, but will prevent counterclockwise rotation thereof. Alternatively, the pawl 51 may be rotated to a position wherein it extends downwardly and to the left in Figure 1, whereby said pawl will allow counterclockwise rotation of the shaft and will prevent clockwise rotation thereof.

Rigidly secured to the lower portion of the member 28 is a horizontally extending U-shaped loop 54 which extends beneath the sleeve 48 and which is spaced a short distance from the lowermost edge portions of the elements 49 and 50. The member 54 serves as a guide loop to guide the boat anchor line, shown in dotted view at 55 for winding and unwinding with respect to the reel defined between the elements 49 and 50 on the sleeve 48. Apertures 56 are provided on the sleeve 48 for anchoring the end of the line 55, whereby the line may be wound on the sleeve 48 and may be unwound therefrom to raise or lower the boat anchor, the line being guided between the side arms of the member 54. The line may be locked in any desired position thereof by using the pawl 51 in cooperation with the notches 53 on the ratchet wheel element 49.

Figure 5:
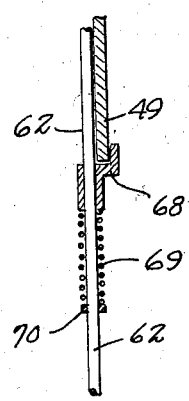
Figure 5 is an enlarged cross sectional view taken on line 5—5 of Figure 1.

Designated generally at 60 is a fishing line drying holder which comprises a pair of rod members 61 and 62 secured rigidly at right angles to each other to the ends of which are rigidly connected spaced portions of a circular wire ring 64. Rigidly secured to the ring 64 at regularly spaced locations thereon are the outwardly extending, parallel fingers 65, said fingers being formed at their ends with the upturned lug portions 66, 66, whereby the fingers 65 define a reel on which a fishing line may be wound for drying. Rigidly secured to the upper portion of the rod 62 and to the respective portions of rod 61 on opposite sides of the rod are respective inwardly directed hook-like lug elements 67 engageable on the periphery of the disc member 50. A movable hook-like lug element 68 is slidably engaged on the lower portion of the rod 62, as shown in Figure 5, said hook-like element 68 being biased inwardly by a coil spring 69 surrounding the lower portion of rod 62 and bearing between the lower end of the sleeve portion of hook 68 and a collar 70 secured on the lower portion of rod 62, as is clearly illustrated in Figure 5, biasing the hook member 68 inwardly. As shown in Figure 5, the hook member 68 may be engageable with the lower portion of the disc member 49, to secure the line dryer 60 on the disc member 49, but being readily disengageable from disc member 49 whenever it is desired to detach the line dryer 60 from said disc member.

As will be readily apparent, when the line dryer 60 is engaged on the disc 50 in the manner shown in the drawings, the dryer 60 is rotated responsive to the rotation of the hand crank 47, whereby the fishing line may be wound on the fingers 65 simultaneously with the winding up of the anchor line 55 on the sleeve member 48. Obviously, the line drying attachment 60 may be fastened in place whenever its use is required and can be employed either independently or in conjunction with the anchor line 55.

While a specific embodiment of an improved combined boat anchor line and fishing line support has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A fishing line drying frame attachment for use on a reel of the type having a rotatable, generally circular outer flange, comprising a plurality of intersecting rod elements rigidly secured together at their intermediate portions at angles to each other, defining substantially coplanar outwardly extending arms, a circular ring member rigidly secured to said arms concentric to the intersection of said rod elements, inwardly directed hook-like elements on the intermediate portions of said rod elements at equal distances from said intersection at one side of the frame thereof and located to engage on the periphery of the outer flange of the reel, at least one of said hook-like elements being slidably mounted on its associated rod element, spring means biasing said one hook-like element inwardly toward said intersection, a plurality of auxiliary rod elements rigidly secured on said ring member and extending substantially normal to the plane of said ring member away from said last named plane on the side thereof opposite said hook-like elements, and outwardly directed lug elements on the opposite ends of said auxiliary rod elements for retaining a fishing line on said auxiliary rod elements.

2. A fishing line drying frame attachment for use on a reel of the type having a rotatably, generally circular outer flange, comprising a pair of rod elements rigidly secured together at right angles to each other at their midportions, defining substantially coplanar outwardly extending arms, a circular ring member rigidly secured to said arms concentric to the intersection of said rod elements, inwardly directed hook-like elements rigidly secured on the intermediate portions of three of said arms at equal distances from said intersection at one side of the plane thereof and located to engage on the periphery of the outer flange of the reel, a hook-like inwardly directed element slidably engaged on the intermediate portion of the remaining arm, spring means on said remaining arm biasing said last named hook-like element inwardly toward said intersection, a plurality of auxiliary rod elements rigidly secured on said ring member and extending substantially normal to the plane of said ring member away from said last named plane on the side thereof opposite said hook-like elements, and outwardly directed lug elements on the opposite ends of said auxiliary rod elements for retaining a fishing line on said auxiliary rod elements.

3. In combination with a reel of the type having a rotatable, generally circular outer flange, means for rotating the reel, and ratchet means limiting rotation of the reel in one direction, a line drying frame comprising a plurality of intersecting rod elements rigidly secured together at their intermediate portions at angles to each other, defining substantially coplanar outwardly extending arms, a circular ring member rigidly secured to said arms concentric with the intersection of said rod element, inwardly directed hook-like elements on the intermediate portions of said rod elements at equal distances from said intersection at one side of the plane thereof and engaging on the periphery of the circular flange of the reel, at least one of said hook-like elements being slidably mounted on its associated rod element, spring means biasing said one hook-like element inwardly toward said intersection, a plurality of auxiliary rod elements rigidly secured on said ring member and extending substantially normal to the plane of said ring member away from said circular flange, and outwardly directed lug elements on the opposite ends of said auxiliary rod elements for retaining a fishing line on said auxiliary rod elements.

References Cited in the file of this patent

UNITED STATES PATENTS

| | | |
|---|---|---|
| 585,059 | Sylvester | June 22, 1897 |
| 919,922 | McMurray | Apr. 27, 1909 |
| 1,192,077 | Kurth | July 25, 1916 |
| 1,552,481 | Gyurcsik | Sept. 8, 1925 |
| 1,567,138 | Hartman et al. | Dec. 29, 1925 |
| 1,800,851 | Wennerstrom | Apr. 14, 1931 |
| 2,219,500 | West | Oct. 29, 1940 |
| 2,283,710 | Waterbury | May 19, 1942 |
| 2,485,412 | Renner | Oct. 18, 1949 |
| 2,546,341 | Jack | Mar. 27, 1951 |
| 2,685,097 | Allen | Aug. 3, 1954 |
| 2,699,918 | Bush | Jan. 18, 1955 |

FOREIGN PATENTS

| | | |
|---|---|---|
| 140,986 | Sweden | Apr. 19, 1953 |